(12) United States Patent
Fukumiya et al.

(10) Patent No.: US 7,730,505 B2
(45) Date of Patent: Jun. 1, 2010

(54) STREAM REPRODUCING DEVICE

(75) Inventors: Eiji Fukumiya, Osaka (JP); Kazuyuki Imagawa, Osaka (JP); Katsuhiro Iwasa, Osaka (JP); Yasunori Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 368 days.

(21) Appl. No.: 11/597,288

(22) PCT Filed: Aug. 26, 2005

(86) PCT No.: PCT/JP2005/015555

§ 371 (c)(1),
(2), (4) Date: Nov. 22, 2006

(87) PCT Pub. No.: WO2006/025284

PCT Pub. Date: Mar. 9, 2006

(65) Prior Publication Data

US 2008/0022295 A1   Jan. 24, 2008

(51) Int. Cl.
   *H04H 60/33* (2008.01)
(52) U.S. Cl. .............................. 725/10; 386/86; 725/142
(58) Field of Classification Search .................... 725/10, 725/12; 386/86
   See application file for complete search history.

(56) References Cited

U.S. PATENT DOCUMENTS 4,858,000 A * 8/1989 Lu .............................. 725/12
6,889,382 B1 * 5/2005 Anderson .................... 725/10
7,134,130 B1 * 11/2006 Thomas ....................... 725/25
2002/0120925 A1 * 8/2002 Logan ........................... 725/9
2005/0166258 A1 * 7/2005 Vasilevsky et al. ........... 725/138

FOREIGN PATENT DOCUMENTS

| JP | 8-9282 | 1/1996 |
|---|---|---|
| JP | 8-18900 | 1/1996 |
| JP | 2002-354409 | 12/2002 |
| JP | 2004-343445 | 12/2004 |
| JP | 2005-64592 | 3/2005 |

* cited by examiner

*Primary Examiner*—Andrew Y Koenig
*Assistant Examiner*—Aklil Tesfaye
(74) *Attorney, Agent, or Firm*—Wenderoth, Lind & Ponack, L.L.P.

(57) ABSTRACT

A stream reproducing device performing automatic viewing of a non-viewed period of a stream. The stream reproducing device comprises a camera a person detecting unit detecting the viewer based on the output of the camera, a viewing information generating unit generating viewing information based on the person detecting unit, and a reproduction control unit receiving supply of a stream, to control reproduction of the stream. The person detecting unit detects each of the viewers by classifying based on the output of the camera. The viewing information generating unit generates the viewing information for each of the viewers based on the detection result of each of the viewers. The viewing information generated by the viewing information generating unit is related to a time stamp of the stream to identify a non-viewed period, for which each viewer does not view the reproduced result of the stream.

11 Claims, 19 Drawing Sheets

Fig. 2(a)
| ID | portrait image |
|---|---|
| 1 | img1 |
| 2 | img2 |
| ⋮ | ⋮ |
| n | imgn |
Fig. 2(b)
| ID | 1 | 2 | 3 | 4 | ... | n |
|---|---|---|---|---|---|---|
| value | true | false | true | false | ... | false |
Fig. 2(c)
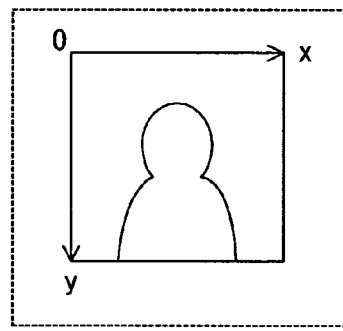
Fig. 2(d)
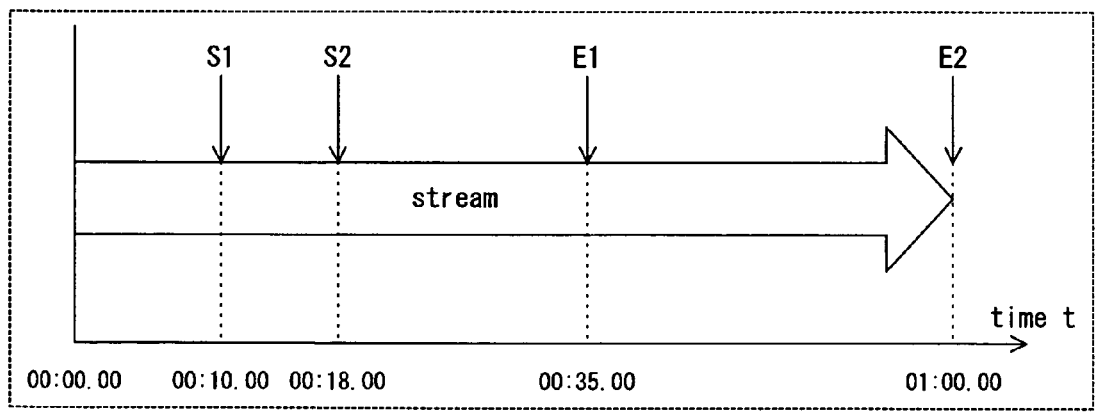

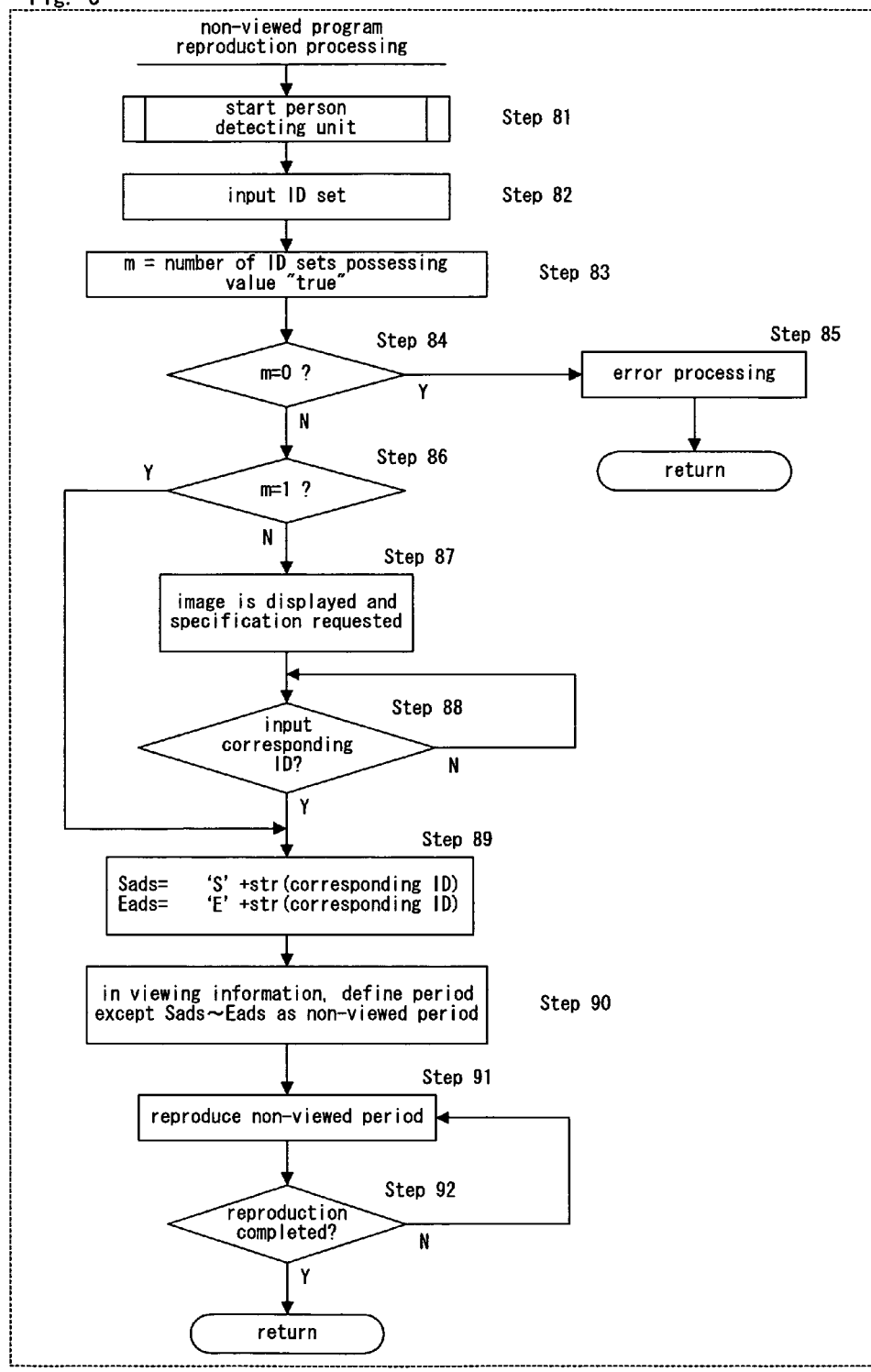

STREAM REPRODUCING DEVICE

TECHNICAL FIELD

The present invention relates to a stream reproducing device which is operable to detect a state of a viewer when reproducing an AV stream (Audio/Visual stream; it is simply called as a "stream" in the present description), and may allow the viewer to easily reproduce a non-viewed period of the stream.

BACKGROUND ART

Document 1 (Published Japanese patent application H08-18900) discloses a technology which detects whether a viewer is present or not in front of a stream reproducing device and performs automatic recording of the stream while the viewer is not present.

More specifically, a television receiver disclosed by Document 1 possesses the structure shown in FIG. 21. In FIG. 21, a terrestrial broadcasting receiving antenna 201 receives a signal of a terrestrial broadcasting. A satellite broadcasting receiving antenna 202 receives a signal of satellite broadcasting. A signal input terminal 203 receives an externally-fed audio and video signal.

A receiving unit 204 consists of a channel selection tuner and a demodulator circuit. The receiving unit 204 performs a channel selection of a specific station from the broadcast wave which antennas 201 and 202 receive, demodulates the selected signal, and generates an audio and video signal. A signal processing circuit unit 205 performs processing for the audio and video signal fed from the receiving unit 204 or the signal input terminal 203, and outputs the processed signal to a signal control unit 206.

A recording and reproducing device unit 207 possesses a recording medium and performs recording and reproduction of an audio and video signal. The reproduced audio and video signal is outputted to the signal control unit 206.

A detection device unit 208 detects whether any viewer is present or not in front of the television receiver, and outputs the detection result to the signal control unit 206.

A display unit 210 displays an image by the video signal. A speaker unit 209 converts a sound signal into sound. Parts other than the antennas 201 and 202 are housed in one case as the television receiver.

When the television receiver is turned on and brought to the state ready to be viewed, the detection device unit 208 detects whether there is any viewer present in front of the television receiver, and outputs the detection result to the signal control unit 206.

While the signal control unit 206 is inputting the detection result indicating the presence of a viewer from the detection device unit 208, the signal control unit 206 does not allow a recording and reproducing device unit 207 to operate. However, when the detection result indicates that the viewer is gone, the signal control unit 206 instructs the recording and reproducing device unit 207 to record the audio and video signal which the viewer has been viewing.

Afterward, when the viewer returns in front of the television receiver and the detection device unit 208 detects that the viewer is present again, the signal control unit 206 instructs the recording and reproducing device 207 to stop recording and to reproduce the recorded audio and video signal. Thereby, the viewer can view the stream for the non-viewed period automatically.

However, in the prior art, unless the audio and video signal itself during the non-viewed period is automatically recorded by the recording and reproducing device unit 207, the viewer cannot view the stream for the non-viewed period later. Therefore, when the remaining recordable time of the recording and reproducing device unit 207 is few or almost zero, the viewer cannot view the stream for the non-viewed period later.

In a place such as a living room (the television receiver is often installed at such a place), people often come and go. In the prior art, when at least one viewer is staying in front of the television receiver, automatic recording during the non-viewed period is not performed. Thus, when a plurality of viewers come and go alternately, and different non-viewed periods exist, the prior art can not handle this situation at all. After all, each of the viewers needs to view the stream for the non-viewed period, by manually finding his/her own non-viewed period and performing troublesome operation such as rewinding and fast-forwarding. Therefore, the prior art has practical difficulty in meeting the theme of automatic viewing of the stream for the non-viewed period later on.

DISCLOSURE OF THE INVENTION

In view of the above, an object of the present invention is to provide the stream reproducing device which can easily perform the automatic viewing of the non-viewed period of a stream.

A first aspect of the present invention provides a stream reproducing device comprising: a detection unit arranged towards viewers; a person detecting unit operable to detect the viewers based on the output of the detection unit; a viewing information generating unit operable to generate viewing information based on the detection result of the person detecting unit; and a reproduction control unit operable to be supplied with a stream and to control reproduction of the stream, thereby outputting a reproduced signal. The viewing information generated by the viewing information generating unit is related to a time stamp of the stream so that the viewing information is able to indicate a non-viewed period during which the viewers have not viewed the reproduced result of the stream.

According to this structure, when the viewer of a stream reproducing device is certainly assumed to be one person like in the case of watching a stream reproducing device arranged in a private room, the viewer can enjoy the automatic viewing of the non-viewed period later, since the viewing information is related with the time stamp of the stream so that a viewer's non-viewed period may become clear. Moreover for the automatic viewing of the non-viewed period, it is sufficient if only the viewing information is saved, and it is not necessary to record the stream itself on some record medium. Therefore, the stream reproducing device according to the present structure can be applied also in cases where there is no margin in the storage capacity of the record medium.

A second aspect of the present invention provides the stream reproducing device, further comprising: an operation entering unit operable to accept input by the viewers, wherein when reproduction directions for the non-viewed period are entered from the operation entering unit, the reproduction control unit determines the non-viewed period based on the viewing information generated by the viewing information generating unit, thereby reproducing the stream for the non-viewed period.

According to this structure, when the viewer of a stream reproducing device is certainly assumed to be one person like in the case of watching a stream reproducing device arranged in a private room, the viewer only directs reproduction of a non-viewed period from the operation entering unit, and can enjoy the automatic viewing of the non-viewed period later. That is, for this automatic viewing, the viewer does not have to perform troublesome operation, such as rewinding or fast-forwarding, and can enjoy the automatic viewing of the non-viewed period very easily.

A third aspect of the present invention provides the stream reproducing device, wherein the person detecting unit detects each of the viewers in a distinguishable manner based on the output of the detection unit, wherein the viewing information generating unit generates viewing information for each of the viewers, based on the detection result for each of the viewers made by the person detecting unit, and wherein the viewing information generated by the viewing information generating unit is related to the time stamp of the stream so that the viewing information is able to indicate a non-viewed period during which each of the viewers has not viewed the reproduced result of the stream.

According to this structure, when the viewers of a stream reproduction device are assumed to be unspecified number like in the case of watching a stream reproduction device that is arranged in a living room, each viewer can enjoy later the respective automatic viewing of his/her own non-viewed period, since the viewing information is related with the time stamp of the stream so that the non-viewed period of each viewer may become clear. The stream reproducing device according to the present structure can respond satisfactorily even to a case where a plurality of viewers go in and out by turns and the respective non-viewed periods are different.

A fourth aspect of the present invention provides the stream reproducing device further comprising: an operation entering unit operable to accept input by the viewers. When reproduction directions for the non-viewed period are entered from the operation entering unit, the reproduction control unit makes the person detecting unit identify a viewer who has entered the reproduction directions from the operation entering unit, and the reproduction control unit determines the non-viewed period based on the viewing information generated by the viewing information generating unit for the viewer who has been identified by the person detecting unit, thereby reproducing the stream for the non-viewed period.

According to this structure, when the viewers of a stream reproduction device are assumed to be unspecified number like in the case of watching a stream reproduction device that is arranged in a living room, the viewing information is related with the time stamp of the stream so that the non-viewed period of each viewer may become clear. Therefore, each viewer only directs reproduction of a non-viewed period from an operation entering unit, and the viewer who has directed the reproduction can be identified, and each viewer can enjoy later the automatic viewing of his/her own non-viewed period. That is, for this automatic viewing, the viewer does not have to perform troublesome operation, such as rewinding or fast-forwarding, and can enjoy the automatic viewing of the non-viewed period very easily.

A fifth aspect of the present invention provides the stream reproducing device, wherein the viewing information generated by the viewing information generating unit includes information related to time stamps marked when the viewers start viewing and time stamps marked when the viewers end viewing.

According to this structure, a viewer's non-viewed period can be clearly determined such that a period up to the time stamp marked when the viewer starts viewing and a period after the time stamp marked when the viewer ends viewing.

A sixth aspect of the present invention provides the stream reproducing device, wherein the detection unit comprises: a camera, and wherein the stream reproducing device further comprises: a person template; a person database operable to store, in a corresponding manner, identification information of each of the viewers and a portrait image of each of the viewers shot by the camera, and a correlation calculating unit operable to perform correlation calculation between an image shot by the camera and the person template, and correlation calculation between an image shot by the camera and the portrait image stored in the person database. The person detecting unit judges whether or not a viewer is viewing the reproduced result of the stream, based on the result of the correlation calculation that has been performed by the correlation calculating unit between the image shot by the camera and the person template, and when the person detecting unit judges that the viewer is viewing the reproduction result of the stream, the person detecting unit identifies the viewer who is viewing the reproduction result of the current steam, base on the result of the correlation calculation performed by the correlation calculating unit between the image shot by the camera and the portrait image.

According to this structure, the person detecting unit can specify the existence or number of viewers, by virtue of the correlation calculating unit which calculates the correlation between the camera-shot picture and the person template and the correlation between the camera-shot picture and the portrait image which is stored in the person database. The person detecting unit specifies the viewer who is viewing the reproduction result of the current stream, based on the result of the correlation calculation by the correlation calculating unit, performed for the camera-shot picture and the portrait image. That is, as long as the viewer is stored in the person database, each viewer can be specified concretely; therefore, each viewer can enjoy the automatic viewing of his/her own non-viewed period later.

A seventh aspect of the present invention provides the stream reproducing device, wherein when the person detecting unit judges that the viewer is viewing the reproduction result of the stream, and when the image shot by the camera does not match any one of the portrait images, as the result of the correlation calculation performed by the correlation calculating unit between the image shot by the camera and each of the portrait images, the person detecting unit adds to the person database, in a corresponding manner, new identification information of the viewer and the portrait image of the viewer shot by the camera.

According to this structure, even if a viewer of whom the portrait image is not yet stored in the person database appears suddenly, the stream reproducing device can respond flexibly, and each viewer can enjoy the automatic viewing of his/her own non-viewed period later, without problem.

BRIEF DESCRIPTION OF THE DRAWINGS

FIG. 2(a) is a data structure diagram of the person database in Embodiment 1 of the present invention;

FIG. 2(b) is a data structure diagram of the ID set in Embodiment 1 of the present invention.

FIG. 2(c) is an exemplification diagram of the person template in Embodiment 1 of the present invention;

FIG. 2(d) is a data structure diagram of the viewing information in Embodiment 1 of the present invention;

FIG. 8 is a flow chart for a reproduction control unit in Embodiment 1 of the present invention;

BEST MODE FOR CARRYING OUT THE INVENTION

The Embodiment of the present invention is explained in the following, referring to the accompanying drawings.

Embodiment 1

Figure 1:
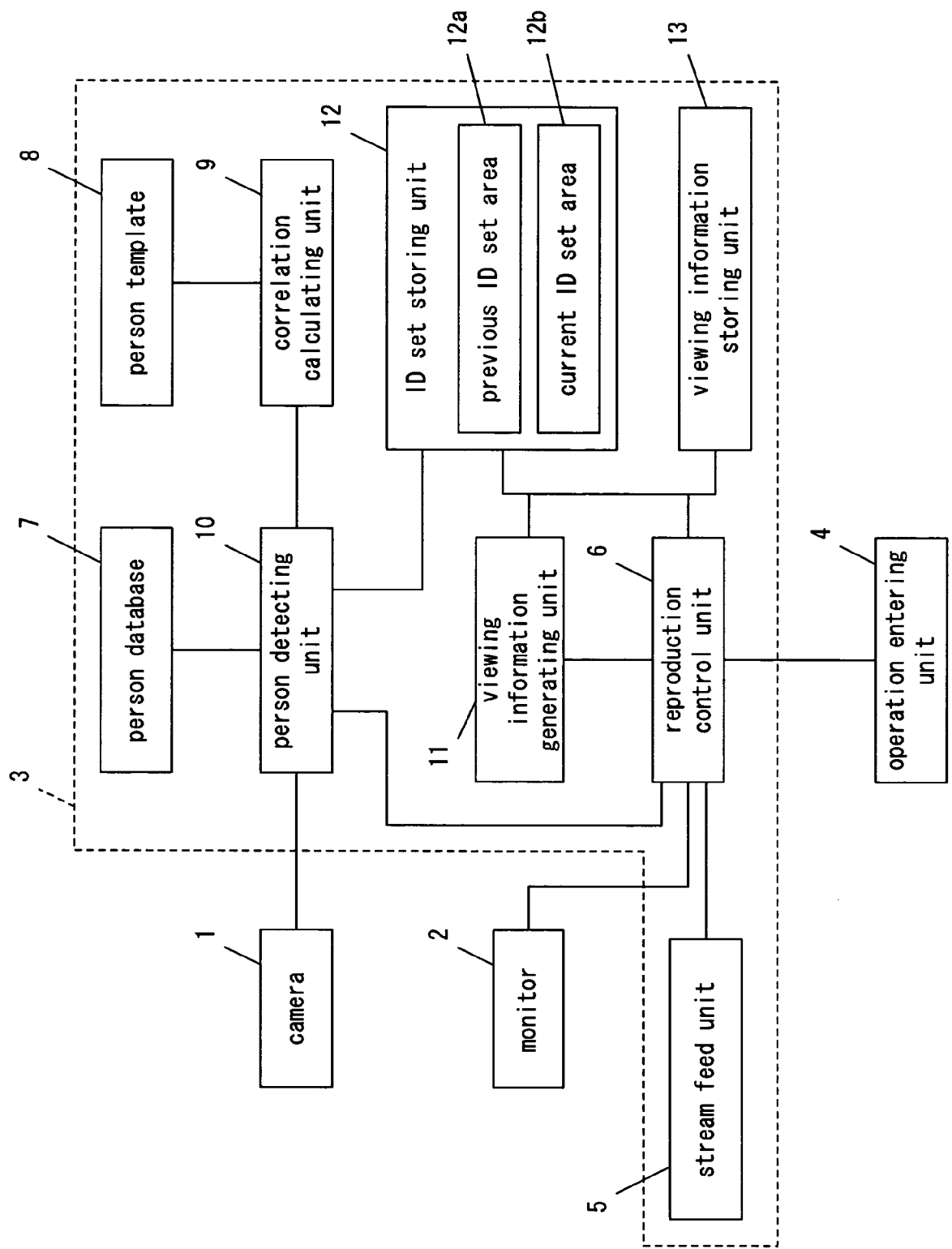
FIG. 1 is a block diagram illustrating a stream reproducing device in Embodiment 1 of the present invention.

FIG. 1 is a block diagram illustrating a stream reproducing device in Embodiment 1 of the present invention.

Figure 10A:
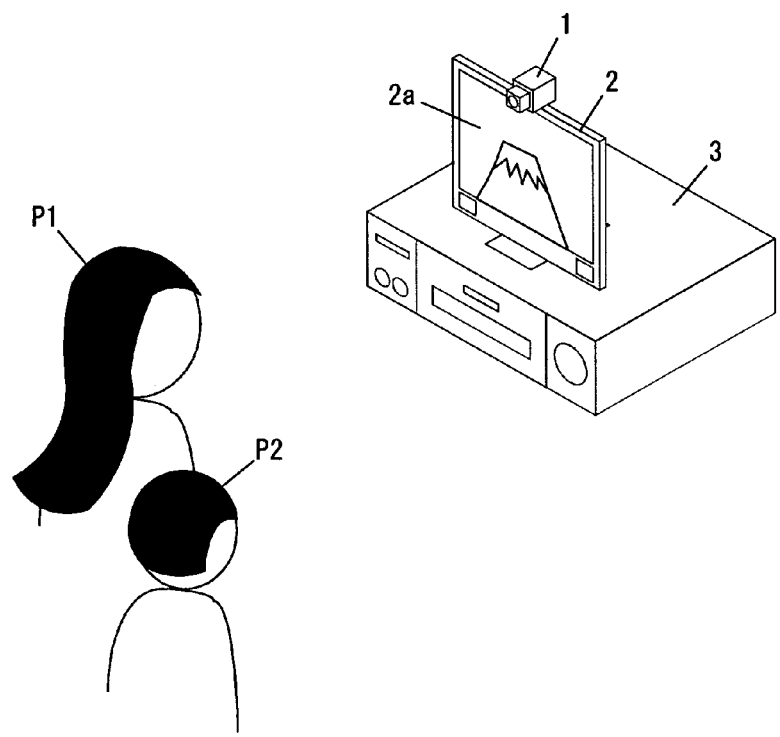
FIG. 10(a) and FIG. 10(b) are exemplification diagrams of the viewing state in Embodiment 1 of the present invention.

In FIG. 1, a camera 1 corresponds to the detection unit. Although the detection unit of the present embodiment is constituted by the camera 1, the detection unit may be constituted by a sensor, as long as there is no trouble in the processing mentioned later. As shown in FIG. 10(a), in order to acquire a viewer's picture, the camera 1 is arranged towards the viewer.

An operation entering unit 4 is constituted by a remote control, a key set, a mouse, an arrow key, and so on. The operation entering unit 4 receives viewer's input.

As shown in FIG. 2(c), a person template 8 holds person-type image data.

As shown in FIG. 2(a), a person database 7 stores identification information (ID; element number: n (n is the natural number)) of each viewer, and a portrait image (img1-imgn) of each viewer taken by the camera 1, in a corresponding manner.

A correlation calculating unit 9 performs the correlation calculation between the image taken by the camera 1 and the person template 8. The correlation calculating unit 9 also performs the correlation calculation between the image taken by the camera 1 and each of the portrait images (img1-imgn) stored in the person database 7. The correlation calculating unit 9 may use a formula that is usually used. Assume that the correlation calculating unit 9 outputs a correlation value in the present embodiment.

A person detecting unit 10 distinguishes and detects each viewer, based on the output of the camera 1. More specifically, based on the result that the correlation calculating unit 9 has obtained through the correlation calculation between the image taken by the camera 1 and the person template, the person detecting unit 10 determines whether the viewer is viewing a reproduction result of a stream, or determines how many viewers are viewing. When the person detecting unit 10 judges that the viewer is viewing the reproduction result of the stream, the person detecting unit 10 identifies which viewer is viewing the reproduction result of the current stream, based on the result that the correlation calculating unit 9 has obtained through the correlation calculation between the image taken by the camera 1 and the portrait images (img1-imgn).

When the person detecting unit 10 judges that the viewer is viewing the reproduction result of the stream, and when the image taken by the camera 1 does not match with any of the portrait images (img1-imgn) as the result of the correlation calculation performed between the image taken by the camera 1 and the portrait images (img1-imgn) by the correlation calculating unit 9, new identification information ID (n+1) of a new viewer and the image taken by the camera 1 are correlated each other, and are added into the person database 7. As a result, the image taken by the camera 1 becomes a new portrait image (imgn+1).

A viewing information generating unit 11 generates viewing information based on the detection result of the camera 1. The viewing information is related with the time stamp of the stream so that the non-viewed period for which the viewer is not viewing the reproduction result of the stream may become clear.

More specifically, as shown in FIG. 2(d), the viewing information includes tags S1, S2 which indicate time stamps at which viewers start viewing, and tags E1, E2 which indicate time stamps at which the viewers stop viewing, in positions from the start position (00:00.00) to the end position (01:00.00). The tags S1 and E1 belong to a viewer with the identification information ID 1. The tags S2 and E2 belong to a viewer with the identification information ID 2.

Thus, the viewing information generating unit 11 generates viewing information for each viewer, based on the detection result of each viewer by the person detecting unit 10. The detection result in the present embodiment is an ID set shown in FIG. 2(b). The ID set is a set in which elements, each composed of the identification information ID and a value ("true" or "false"), are collected to the number of viewers (the value "true" indicates that a viewer is present in front of the stream reproducing device 3 and the value "false" indicates that a viewer is not present in front of the stream reproducing device 3). The ID set is stored in an ID set storing unit 12. The ID set storing unit 12 possesses two areas: a previous ID set area 12a operable to store the previous ID set, and a current ID set area 12b operable to store the present ID set. The areas are provided in order to make each viewer's state transition clear.

As shown in FIG. 2(d), according to the tags S1 and E1 and the tags S2 and E2, the non-viewed period for which each viewer is not viewing the reproduction result of the stream becomes clear. In other words, the non-viewed period of the viewer with the identification information ID 1 is from the start position of the stream to the tag S1 and from the tag E1 to the end position of the stream. The non-viewed period of the viewer with the identification information ID 2 is from the start position of the stream to the tag S2. Since the data amount of viewing information is extremely smaller than that of the audio and video signals, the viewing information can be stored either inside or outside of the stream. In the present embodiment, the viewing information is stored in the viewing information storing unit 13.

A stream feed unit 5 possesses record media (a DVD, an HD, etc.) operable to record the stream, and supplies the stream to a reproduction control unit 6. Alternatively, the stream feed unit 5 may download the stream from a server (not shown in the figure) via a network, and may acquire the stream from a broadcasting station etc. via an antenna or a cable.

The reproduction control unit 6 receives the supply of the stream from the stream feed unit 5, controls the reproduction of the stream, and then outputs a reproduced signal to a monitor 2. The monitor 2 reproduces the contents (an image and a voice) of the stream, based on the reproduced signal fed by the reproduction control unit 6.

When reproduction direction of the non-viewed period is inputted from the operation entering unit 4, the reproduction control unit 6 makes a person detecting unit 10 identify a viewer who has inputted the reproduction direction by the operation entering unit 4. Then, the reproduction control unit 6 determines the viewer's non-viewed period, based on the viewing information of the identified viewer (the viewing information is stored in the viewing information storing unit 13), and then reproduces the non-viewed period of the stream.

Figure 3:
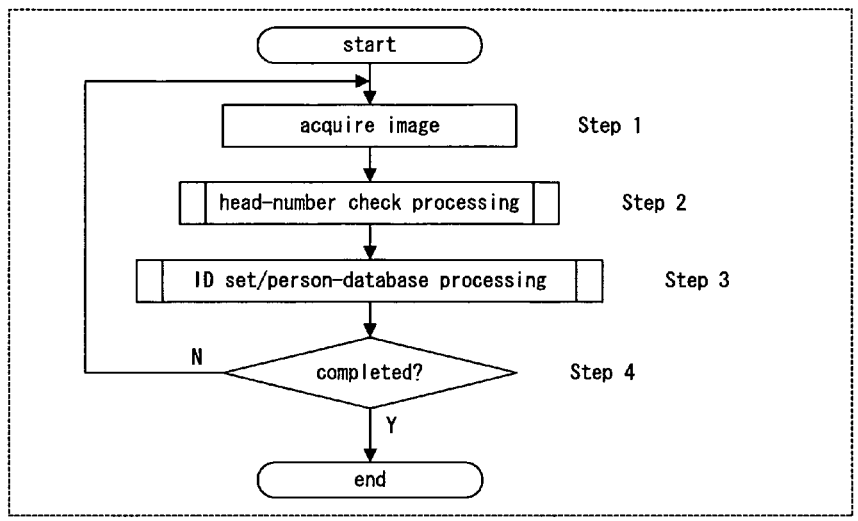
FIG. 3 is a flow chart for a person detecting unit in Embodiment 1 of the present invention.
Figure 4:
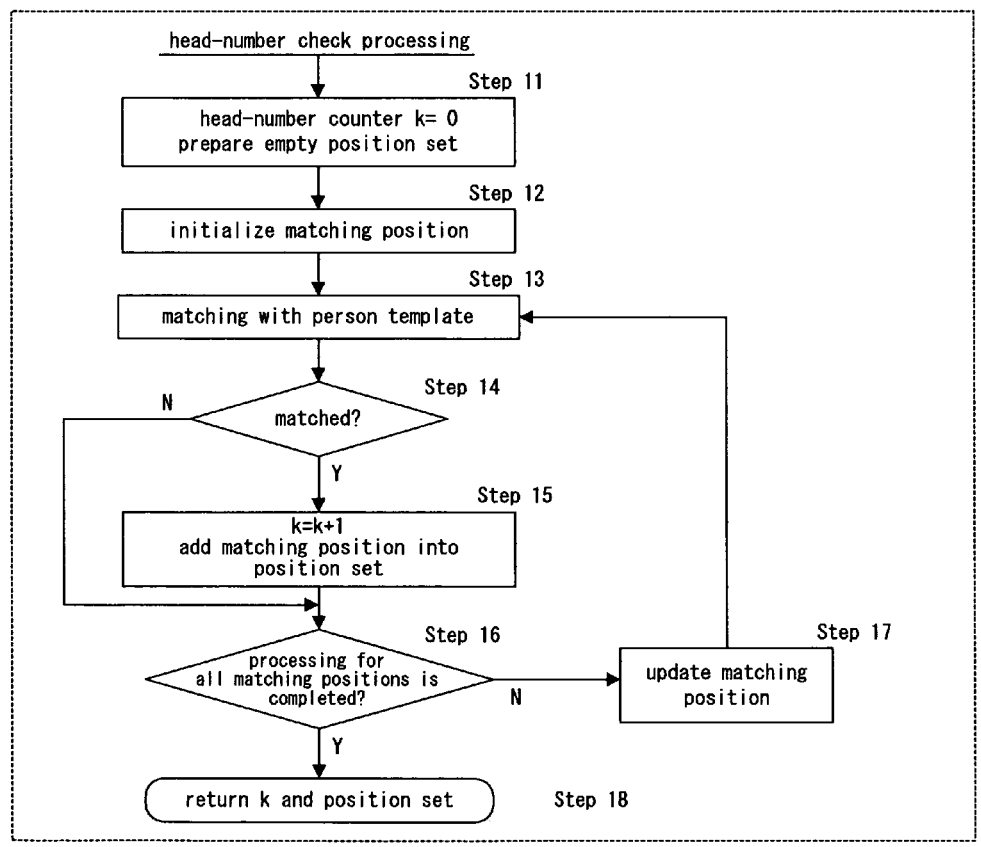
FIG. 4 is a flow chart for a person detecting unit in Embodiment 1 of the present invention.
Figure 5:
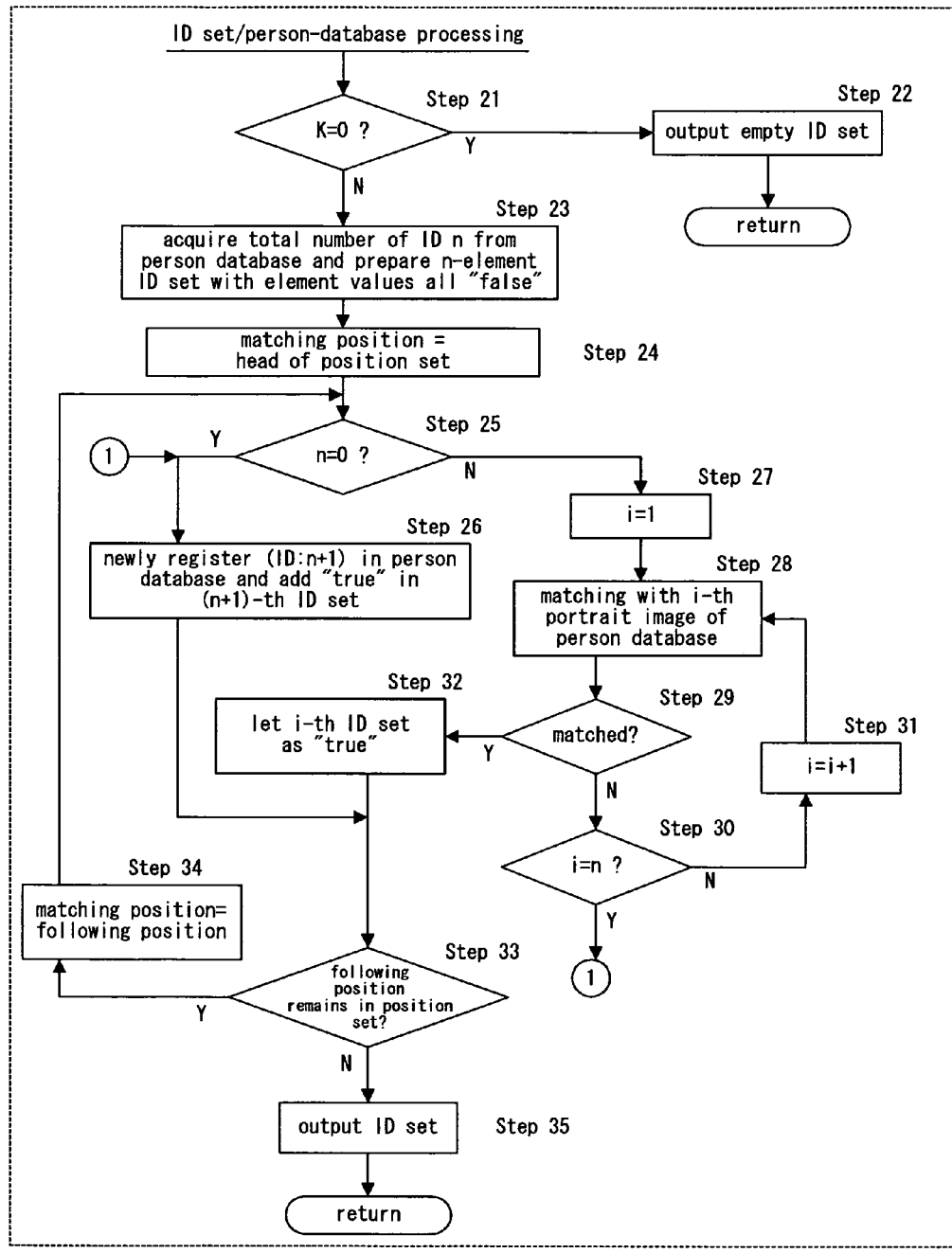
FIG. 5 is a flow chart for a person detecting unit in Embodiment 1 of the present invention.

The following explains the processing of the person detecting unit 10, referring to FIG. 3 through FIG. 5. As shown in FIG. 3, at Step 1, when the camera 1 acquires an image, the person detecting unit 10 performs the number-of-persons confirmation processing shown in FIG. 4 (Step 2). Next, the person detecting unit 10 performs the ID set/person-database processing shown in FIG. 5 at Step 3. Then, the person detecting unit 10 repeats the processing from Step 1 to Step 3 until the processing completes (Step 4).

As shown in FIG. 4, the number-of-persons confirmation processing is performed as follows. First, at Step 11, the person detecting unit 10 assumes that the number-of-persons counter k=0, and prepares an empty position set. Here, the position set is a set of positions, at each of which matching is obtained with the person template 8 and a viewer is regarded as being present, as explained later.

At Step 12, the person detecting unit 10 initializes a matching position to a start position. Here, the matching position is a position currently targeted by the matching and located within one of a finite number of areas into which the picture area taken by the camera 1 is divided. In the present embodiment, the matching position is assumed at the center of an area which is equal in size to the person template 8, and the correlation calculating unit 9 performs the correlation calculation between the person template 8 and a part of image located in the area, the image having been taken by the camera 1.

At Step 13, the person detecting unit 10 orders the correlation calculating unit 9 to perform the correlation calculation in the current matching position. The correlation calculating unit 9 performs the calculation, and returns the result (a correlation value) to the person detecting unit 10. The person detecting unit 10 holds a predetermined threshold, and compares in magnitude the threshold and the correlation value which is acquired by the correlation calculating unit 9. When the correlation value is equal to or greater than the threshold, the person detecting unit 10 judges that the current matching position matches the person template 8. When the correlation value is less than the threshold, the result is judged as being mismatched. When the result of the magnitude comparison is judged as being matched (Step 14), the person detecting unit 10 increases the number-of-persons counter k by "1", and then adds the current matching position to the position set (Step 15). Then, the processing moves to Step 16. When the result is not judged as being matched, the person detecting unit 10 takes no action and the processing immediately moves to Step 16.

At Step 16, the person detecting unit 10 checks whether the processing regarding all matching positions is completed. When it is not completed, the matching position is moved to the next position (Step 17), and the processing after Step 13 is repeated. When it is completed, at Step 18, the number-of-persons confirmation processing finishes, returning the number-of-persons counter k and the position set as the return values.

The following explains the ID set/person-database processing, referring to FIG. 5. Although the value of the number-of-persons counter k is acquired at Step 18 of FIG. 4, if there is no viewer in the visual field of the camera 1, the number-of-persons counter k is still "0" (refer to Step 11). When the result at Step 21 is "Yes," the person detecting unit 10 outputs an empty ID set only (Step 22). Then, the ID set/person-database processing ends.

When the number-of-persons counter k is not "0" (that is, at least one person is on the image), the processing moves to Step 23. At Step 23, the person detecting unit 10 accesses the person database 7, acquires a total number of ID n, and prepares an n-element ID set (the element values are all "false"). Although the ID set is already described, the ID set in the present case is nothing but FIG. 2(b), but all the element values are set "false."

Since the position set is acquired at Step 18, the head position of the position set is regarded as the matching position (Step 24). However, this matching position is a position for matching with the portrait images (img1-imgn) in the person database 7. In this regard, it is different from the matching position of FIG. 4.

Next, the person detecting unit 10 checks the element number n at Step 25. Here, a case of n=0 is possible to happen. It is a case where no portrait image has been registered in the person database 7. In this case, the person detecting unit 10 moves the processing to Step 26. The person detecting unit 10 registers newly a part of image located in the area defined by the current matching position into the person database 7, the image having been taken by the camera 1. The person detecting unit 10 turns the corresponding value of the ID set into "true." At this time, the identification information ID=n+1 (if n=0, then ID=1) is given to the image to be newly registered. Then, the person detecting unit 10 moves the processing to Step 33.

If n≠0 at Step 25 (it is a case where at least one set of the pair of the identification information ID and the portrait image is already registered), the person detecting unit 10 sets a number counter as i=1 at Step 27. At Step 28, the correlation calculating unit 9 is ordered to perform the correlation calculation between the i-th portrait image and the image within the area defined by the current matching position, and acquire the correlation value. Here, similar to FIG. 4, the magnitude comparison of the predetermined threshold and the correlation value is performed. If the correlation value is equal to or greater than the threshold, the person detecting unit 10 judges that the current matching position is being matched to the i-th portrait image. If the correlation value is less than the threshold, it is judged as mismatched. If the result of the magnitude comparison (Step 29) is "matched", the person detecting unit 10 changes the i-th value of the ID set from "false" to "true" (Step 32), and moves the processing to Step 33.

If the result of the magnitude comparison is "mismatched", at Step 30, the person detecting unit 10 increments the number counter i by one (Step 31), and repeats the processing up to Step 28 until the number counter i reaches the element number n. When the number counter i is equal to the element number n, the person detecting unit 10 judges that the image does not match with all portrait images currently registered in the person database 7 (in other words, the image is a new viewer's portrait image). At Step 26, the person detecting unit 10 registers newly the image within the current area into the person database 7 (the identification information ID=n+1), and sets the corresponding value of the ID set to "true."

At Step 33, the person detecting unit 10 checks whether there remains the following position in the position set. If there remains the following position, the matching position is set at the following position at Step 34, and the processing returns to Step 25. If there is no following position, it means that the consideration for all positions is completed, the person detecting unit 10 outputs the ID set to the current ID set area 12b at Step 35, and the processing moves to Step 4 of FIG. 3.

Figure 6:
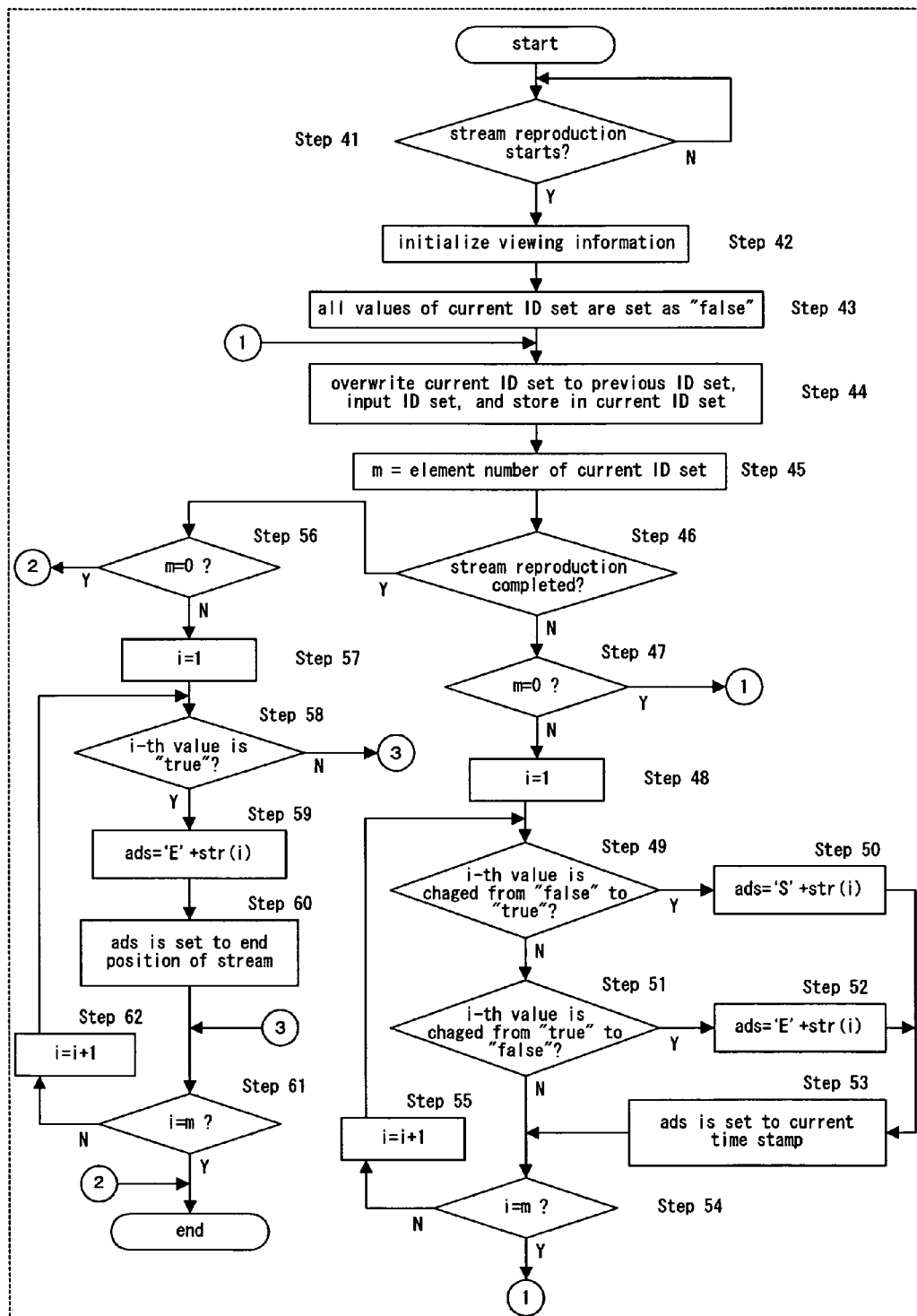
FIG. 6 is a flow chart for a viewing information generating unit in Embodiment 1 of the present invention.

The following explains the processing of the viewing information generating unit 11, referring to FIG. 6. First, at Step 41, the viewing information generating unit 11 waits until stream reproduction starts. Immediately after the stream reproduction has started, the viewing information generating unit 11 initializes the viewing information storing unit 13 to the state where nobody is viewing for the sake of convenience (Step 42). At Step 43, all values are set to "false" for both of the previous ID set area 12a and the current ID set area 12b.

At Step 44, the viewing information generating unit 11 overwrites the present ID set (it is empty immediately after the stream reproduction) to the previous ID set area 12a, waits until an ID set is inputted from the person detecting unit 10 (Step 35), and then overwrites the current ID set area 12b with the inputted ID set. At Step 45, the viewing information generating unit 11 sets the element number of the inputted ID set to the number m.

At Step 46, the viewing information generating unit 11 checks whether the stream reproduction is completed. When the stream reproduction is completed, the viewing information generating unit 11 moves the processing to Step 56. When the stream reproduction is not completed, the viewing information generating unit 11 moves the processing to Step 47.

At Step 47, the viewing information generating unit 11 checks whether the number m is "0." If the number m is "0", it indicates that there is no viewer; therefore, the viewing information generating units 11 moves the processing to Step 44 without doing anything.

If the number m is not "0", it indicates that there is at least one viewer. Thus, the viewing information generating unit 11 sets the number counter i=1 (Step 48). At Step 49, the viewing information generating unit 11 checks whether the i-th value of the previous ID set area is "false", and whether the i-th value of the current ID set area is "true." If so, it means that the state of the i-th viewer has transited, from the state where the viewer is not present in front of the stream reproducing device 3, to the state where the viewer is present in front of the stream reproduction device 3. When the state transition occurs, it means either that the viewer comes in front of the stream reproducing device 3 and starts viewing for the first time, or that the viewer comes back in front of the stream reproducing device 3 after a break.

When this state transition occurs, the viewing information generating unit 11 adopts, as a tag character string ads, a character string which consists of the character "S" followed by the number i in a character string expression, at Step 50. At Step 53, the viewing information generating unit 11 sets the tag character string ads at the position pointing the current time stamp. Thereby, the tag "S*" (* is the character string which the number i is converted into) is added to the viewing information which is stored in the viewing information storing unit 13.

Alternatively, the viewing information generating unit 11 checks whether the i-th value of the previous ID set area is "true", and the i-th value of the current ID set area is "false" (Step 51). If so, it means that the state of the i-th viewer has transited, from the state where the viewer is present in front of the stream reproducing device 3, to the state where the viewer is not present in front of the stream reproducing device 3. If this transition occurs, it indicates that the viewer has been viewing in front of the stream reproducing device 3, but stops viewing and moves to somewhere.

When this state transition occurs, the viewing information generating unit 11 adopts, as a tag character string ads, a character string which consists of the character "E" followed by the number i in a character string expression, at Step 52. The viewing information generating unit 11 sets the tag character string ads to the position indicating the current time stamp at Step 53. Thereby, the tag "E*" (* is the character string which the number i is converted into) is added to the viewing information which is stored in the viewing information storing unit 13.

At Step 54, the viewing information generating unit 11 increments the number-counter i by one until the number-counter i reaches the number m (Step 55), and the processing from Step 49 is repeated.

Now, the stream reproduction is completed at Step 56. For this reason, the viewing information generating unit 11 performs processing in the following steps, and adds the end tag "E*" (* is the character string which the number i is converted into), which indicates the end position of the stream, to the viewing information to be stored into the viewing information storing unit 13, regarding the viewer who was present in front of the stream reproducing device 3 when the end position of the stream was reproduced.

Namely, the viewing information generating unit 11 checks whether the number m is equal to 0. When m=0, it means that no viewer is present when the end position of the stream is reproduced; therefore, the viewing information generating unit 11 ends the processing immediately.

When the number m is not "0," it means that at least one viewer is present in front of the stream reproducing device 3 when the end position of the stream is reproduced. Thus, the viewing information generating unit 11 sets the number-counter as i=1 (Step 57), and checks whether the i-th value in the current ID set area 12b is "true" (Step 58). If so, as similar to Step 51, the viewing information storing unit 13 adds the end tag "E*" (* is the character string which the number i is converted into), which indicates the end position of the stream, to the viewing information to be stored into the viewing information storing unit 13 (Steps 59 and 60). Until the number-counter i reaches the number m (Step 61), the viewing information generating unit 11 increments the number-counter i by one (Step 62), and repeats the above-mentioned processing.

Figure 7:
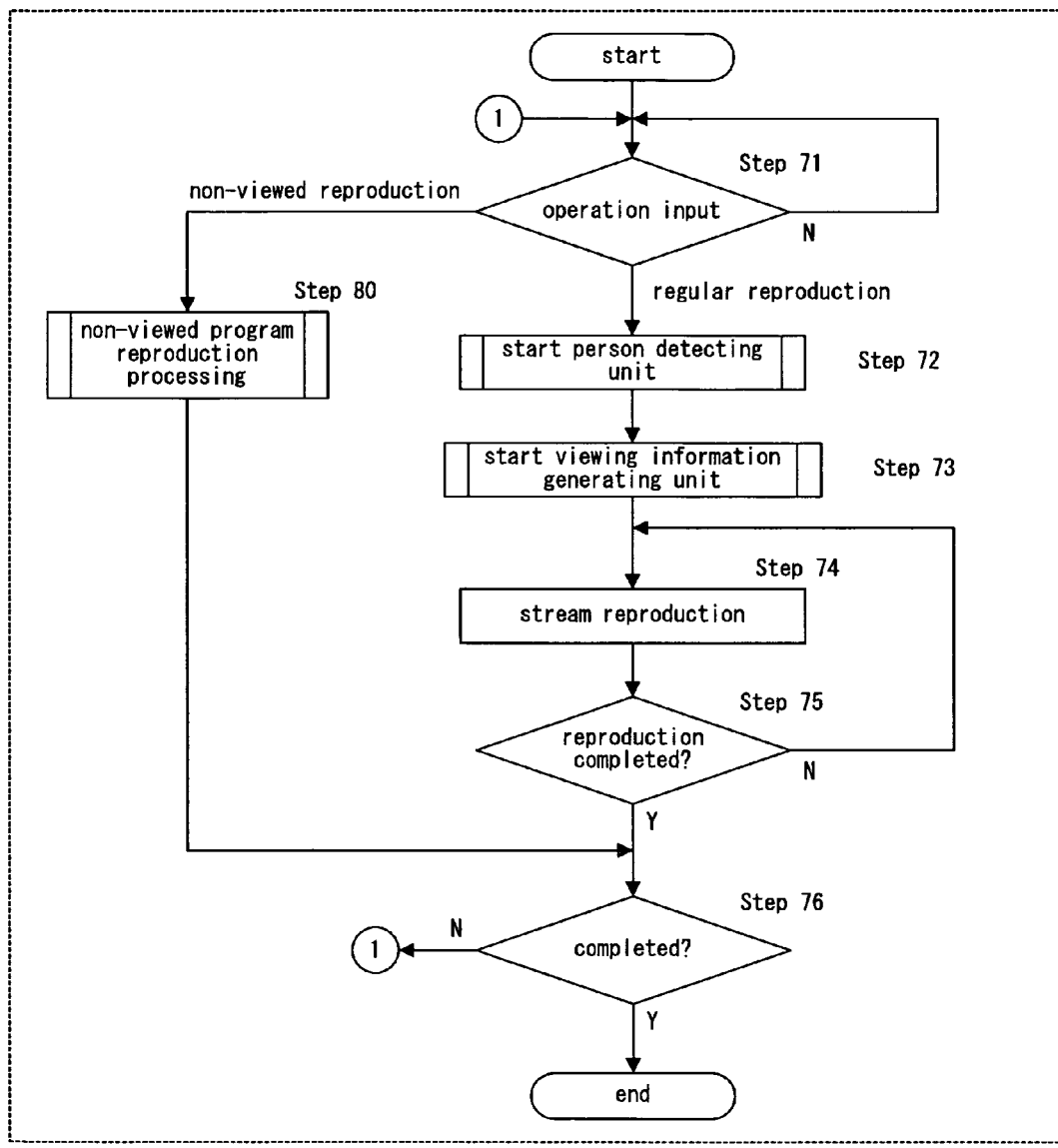
FIG. 7 is a flow chart for a reproduction control unit in Embodiment 1 of the present invention.

The following explains the processing of the reproduction control unit 6, referring to FIGS. 7 and 8. First, at Step 71, the reproduction control unit 6 waits until the operation entering unit 4 receives input. When the received input is regular reproduction, the reproduction control unit 6 starts the person detecting unit 19 at Step 72, and starts the viewing information generating unit 11 at Step 73. Thereby, the stream reproducing device is brought to the following state: When a new viewer appears, the portrait image and identification information of the viewer are added, in a corresponding manner, to the person database 7. When a viewer comes and goes, the tags "S*" and "E*", which indicate the time stamps, are added to the viewing information.

At Step 74, the reproduction control unit 6 starts the reproduction of the stream, and maintains the state until the reproduction is completed (Step 75). After the completion, the processing moves to Step 76.

On the other hand, when the reproduction of the non-viewed period is directed in the operation entering unit 4 at Step 71, the reproduction control unit 6 performs, at Step 80, the non-viewed program reproduction processing shown in FIG. 8. Namely, at Step 81, the reproduction control unit 6 starts the person detecting unit 10, and inputs the ID set (Step 82). At Step 83, the reproduction control unit 6 regards the number m as the number of ID sets which possess the values of "true" among the ID sets that are inputted.

When the number m=0, it means that the operation input has occurred although there is no viewer (Step 84). This is a contradiction. Thus, the reproduction control unit 6 performs the error processing and returns to the state (Step 85) to wait for another input (Step 71). As the error processing, an example is to display a message "the non-viewed program can not be reproduced" etc. on the monitor 2.

When the number m is not "0", the reproduction control unit 6 checks whether the number m=1 at Step 86. When the number m=1, it means that there is only one viewer, and it is possible to automatically identify which viewer has given the reproduction direction of the non-viewed period. Thus, the reproduction control unit 6 accesses the viewing information storing unit 13, based on the identification information ID for the viewer, and specifies the non-viewed period (Steps 86, 89, and 90).

When the number m is equal to or greater than "2," in order to specify whose non-viewed period should be reproduced, at Step 87 and 88, candidate portrait images are displayed on the monitor 2 to the viewer who has demanded the reproduction of the non-viewed period, thereby requesting the viewer to specify which portrait image is of the viewer. In response to the request, if the viewer inputs the identification information ID concerned, the viewer who has requested the reproduction of the non-viewed period can be identified uniquely. Thus, from the viewer's point of view, since the viewer just needs to choose a number corresponding to the image of his/her own face, the operation is extremely easier compared with otherwise needed operation, such as rewinding or fast-forwarding.

When the identification is completed as mentioned above, at Step 89 and 90, the non-viewed period is specified in detail, and the reproduction control unit 6 reproduces the stream for the non-viewed period (Steps 91 and 92).

The above-mentioned processing is just an example; as long as it falls in the main point of the present invention, various changes can be made.

Figure 9A:
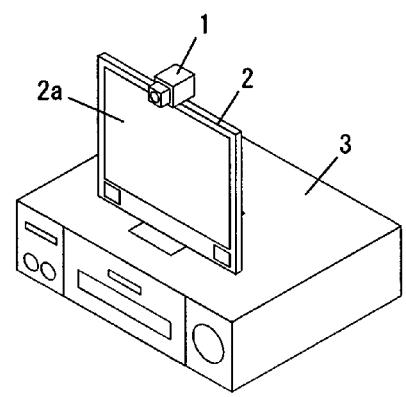
FIG. 9(a) and FIG. 9(b) are exemplification diagrams of the viewing state in Embodiment 1 of the present invention.
Figure 9B:
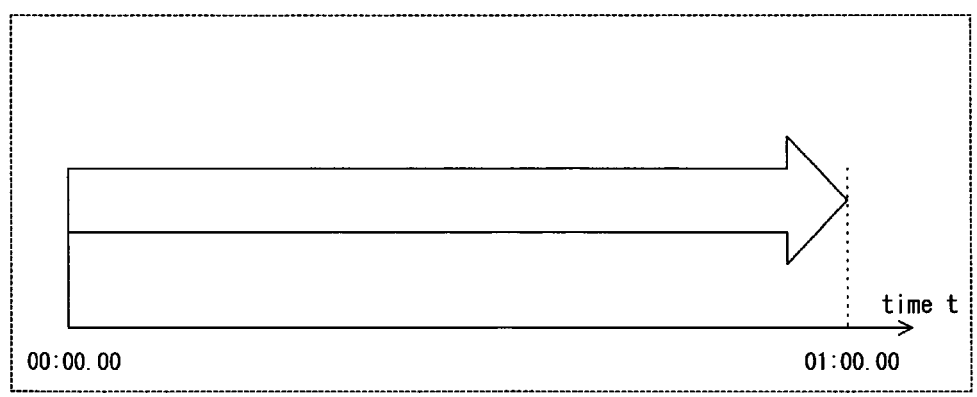

Giving an example, the following explains the change of the viewing information by adding a tag. First, as shown in FIG. 9(*a*), assume the state where there is no viewer present in front of the stream reproducing device 3. At this time, the viewing information includes only the start position and the end position of the stream, as shown in FIG. 9(*b*). Since the camera 1 does not shoot a viewer's picture, there is nothing displayed in the picture 2*a* of the monitor 2.

Figure 10B:
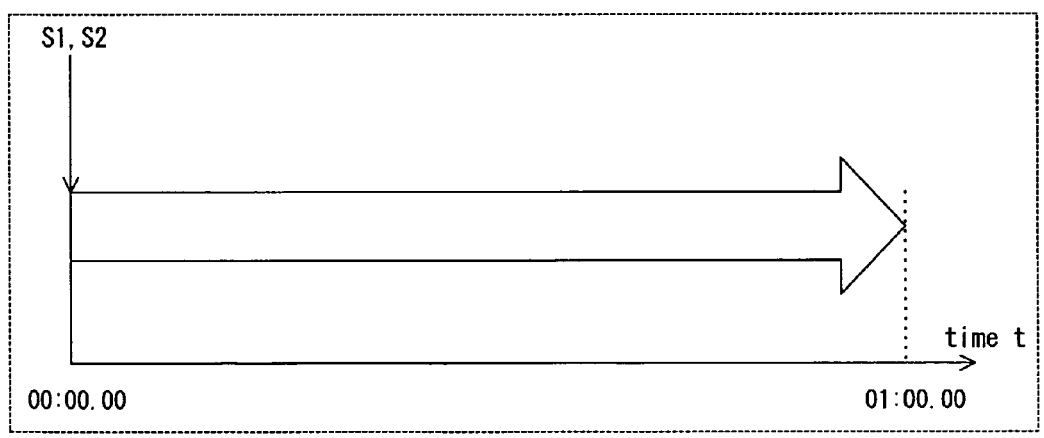

Next, as shown in FIG. 10(*a*), assume that a mother P1 and a child P2 sit down in front of the stream reproducing device 3, and start viewing. Then, the camera 1 shoots images of the mother P1 and the child P2; and the fact that there are two viewers present is detected through matching by the person template 8. When the portrait images of the mother P1 and the child P2 are not in the person database 7, the portrait images are newly registered in the person database 7. The tag S1 corresponding to the mother P1 and the tag S2 corresponding to the child P2 are added to the start position of the stream.

Figure 11A:
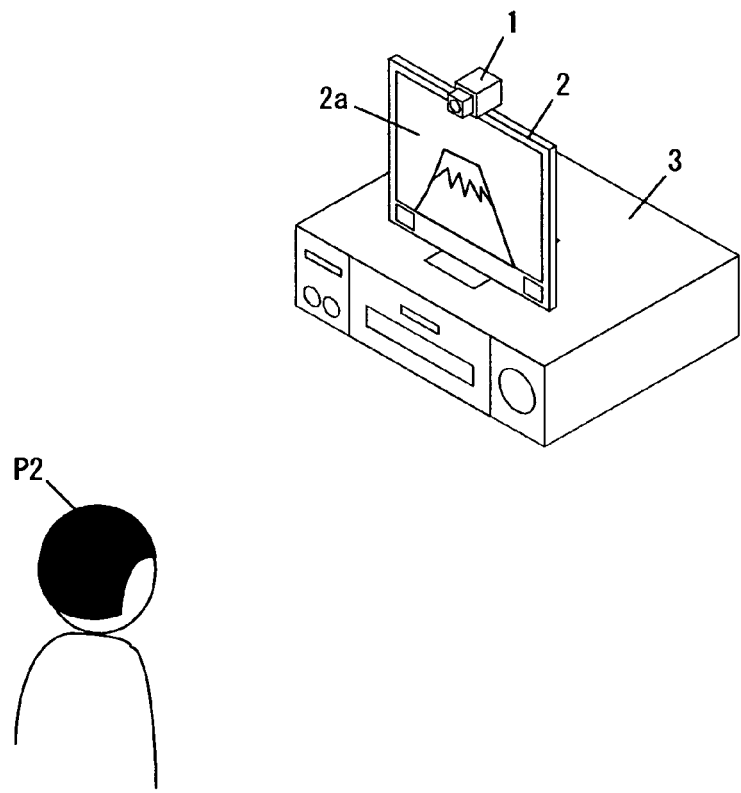
FIG. 11(a) and FIG. 11(b) are exemplification diagrams of the viewing state in Embodiment 1 of the present invention.
Figure 11B:
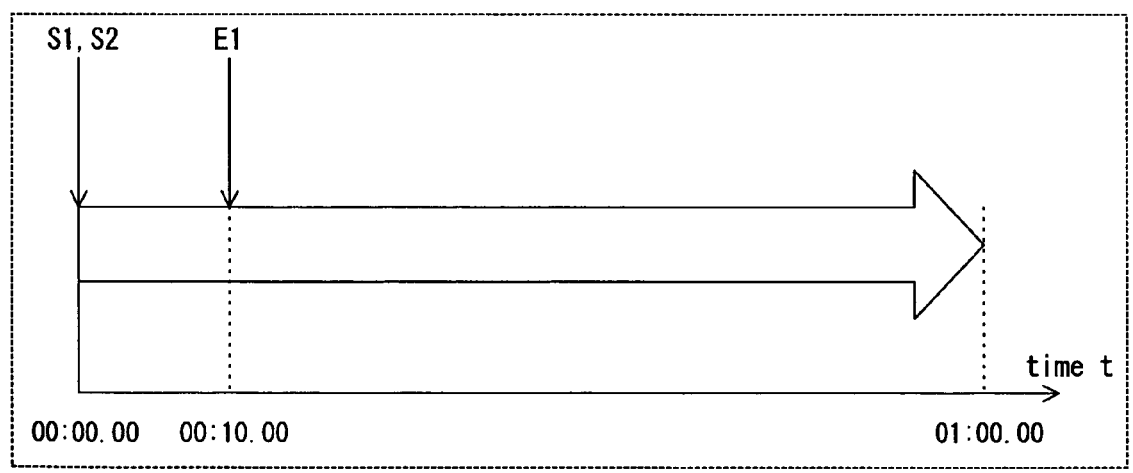

Afterward, as shown in FIG. 11(*a*), when the mother P1 stops viewing for some reason, the tag E1 corresponding to the mother P1 is added as shown in FIG. 11(*b*).

Figure 12A:
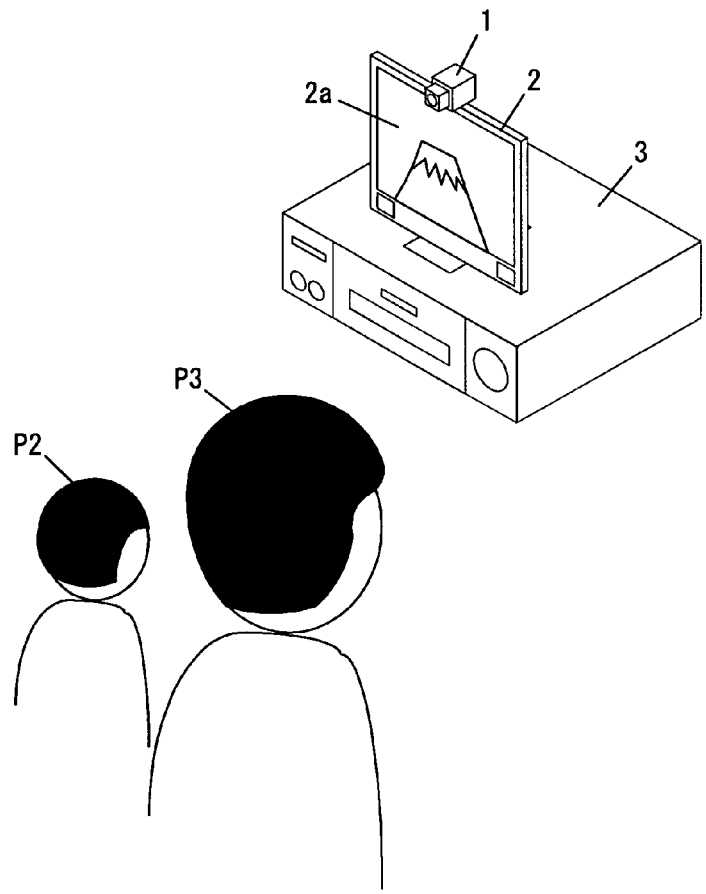
FIG. 12(a) and FIG. 12(b) are exemplification diagrams of the viewing state in Embodiment 1 of the present invention.
Figure 12B:
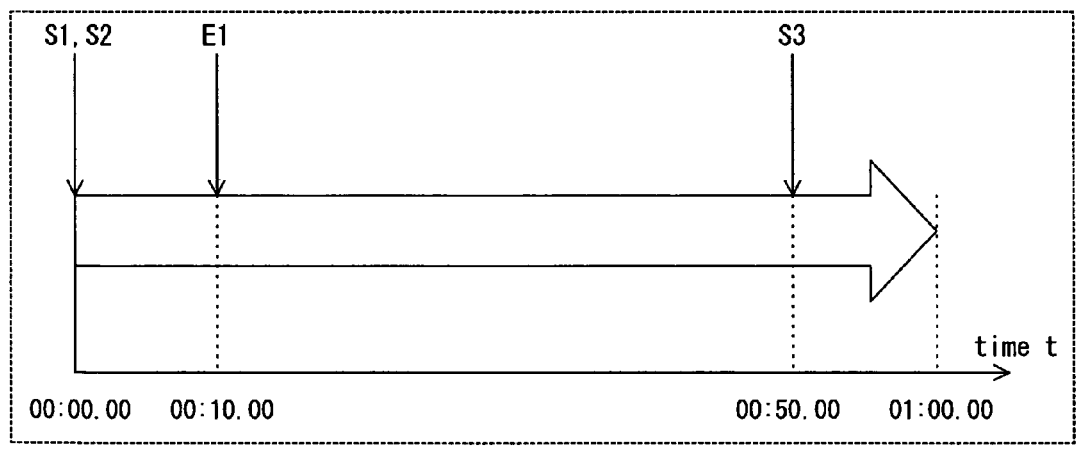

As shown in FIG. 12(*a*), when a father P3 newly starts viewing, the tag S3 corresponding to the father P3 is added as shown in FIG. 12(*b*).

Figure 13A:
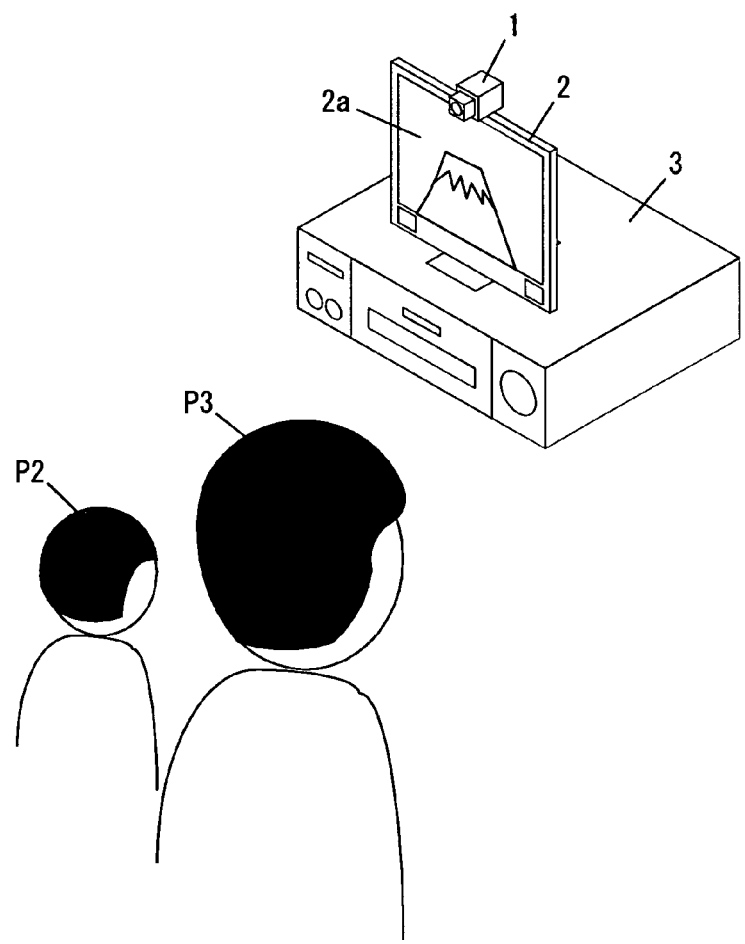
FIG. 13(a) and FIG. 13(b) are exemplification diagrams of the viewing state in Embodiment 1 of the present invention.
Figure 13B:
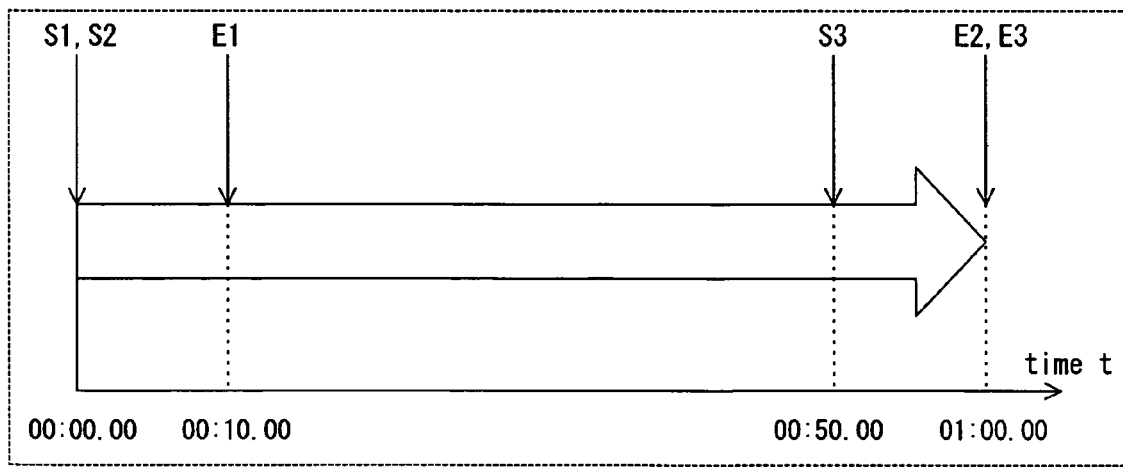

As shown in FIG. 13(*a*), when the child P2 and the father P3 keep viewing until the end position of the stream, the tag E2 corresponding to the child P2 and the tag E3 corresponding to the P3 are added at the end position of the stream.

Figure 14A:
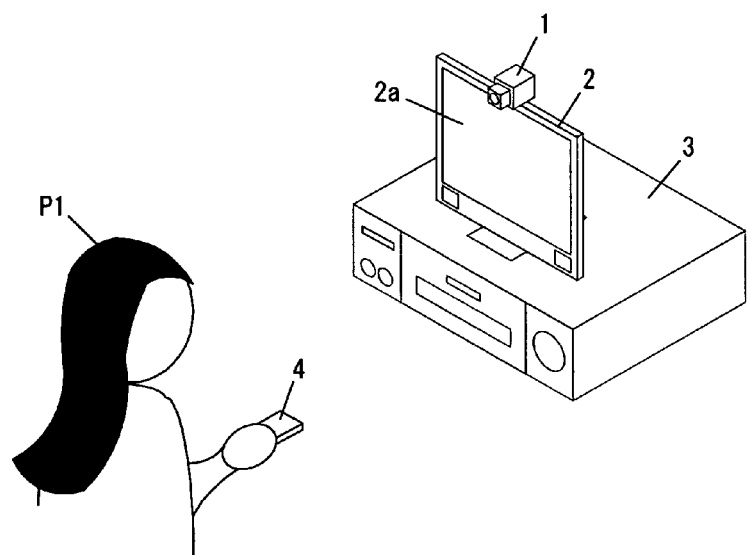
FIG. 14(a) and FIG. 14(b) are exemplification diagrams of the viewing state in Embodiment 1 of the present invention.
Figure 14B:
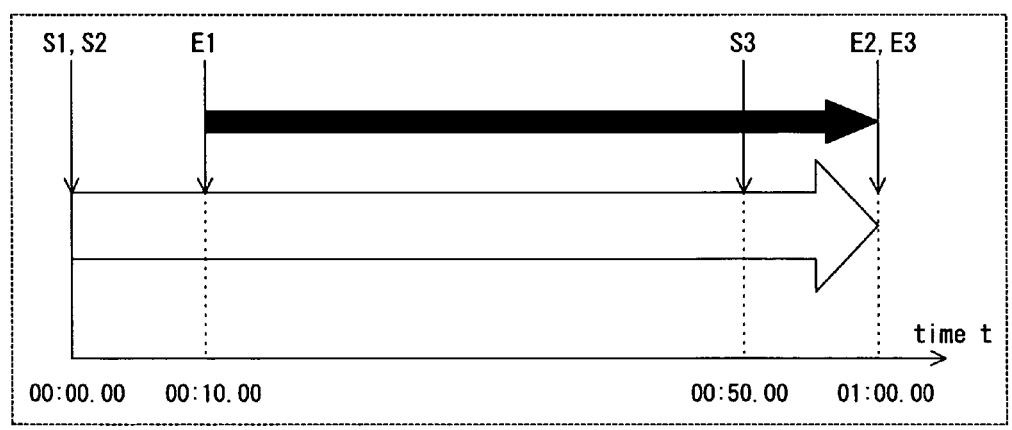

Afterward, as shown in FIG. 14(*a*), when the mother P1 returns in front of the stream reproducing device 3 and gives the direction for reproduction of the non-viewed period using the operation entering unit 4, the non-viewed period for the mother P1 is specified as the black arrow shown in the FIG. 14(*b*) (from the tag E1 to the end position of the stream), by the processing of Steps 86, 89 and 90 of FIG. 8, and the stream for the non-viewed period is automatically reproduced. Here, the mother P1 needs to give only the direction of reproduction of the non-viewed period, but does not need to perform any troublesome operations, such as rewinding and fast-forwarding.

(Modification)

Figure 15:
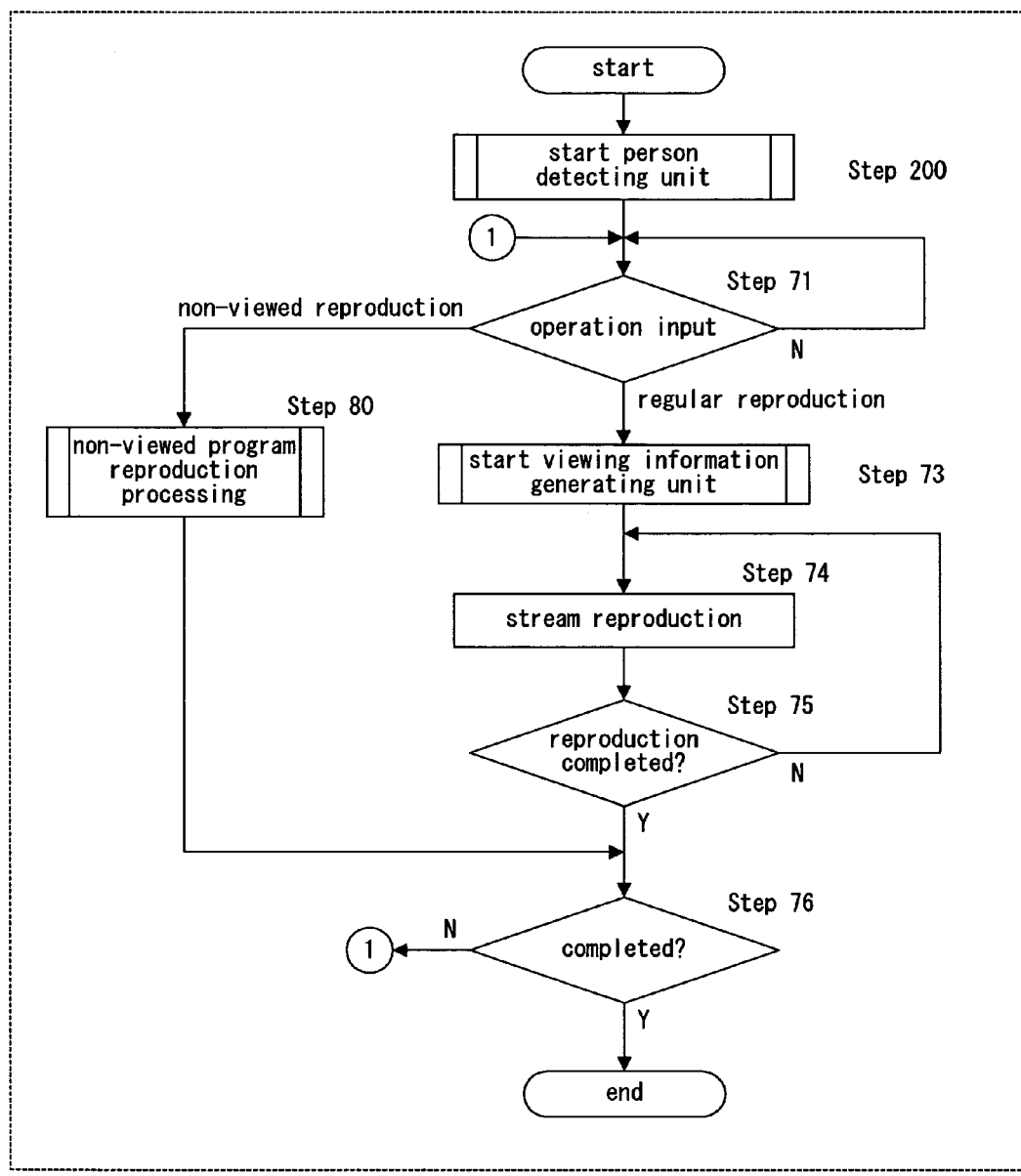
FIG. 15 is the flow chart of the reproduction control unit in the modification of the present invention.

Hereafter, the modification of the above-mentioned embodiment is explained, referring to FIGS. 15 to 20. In FIG. 7, the person detecting unit is started (Step 72) after the operation input of directing "regular reproduction" is processed at Step 71. However, as shown in FIG. 15, after starting the person detecting unit (Step 200), the processing may move to the state of waiting for the operation input (Step 71).

Figure 16:
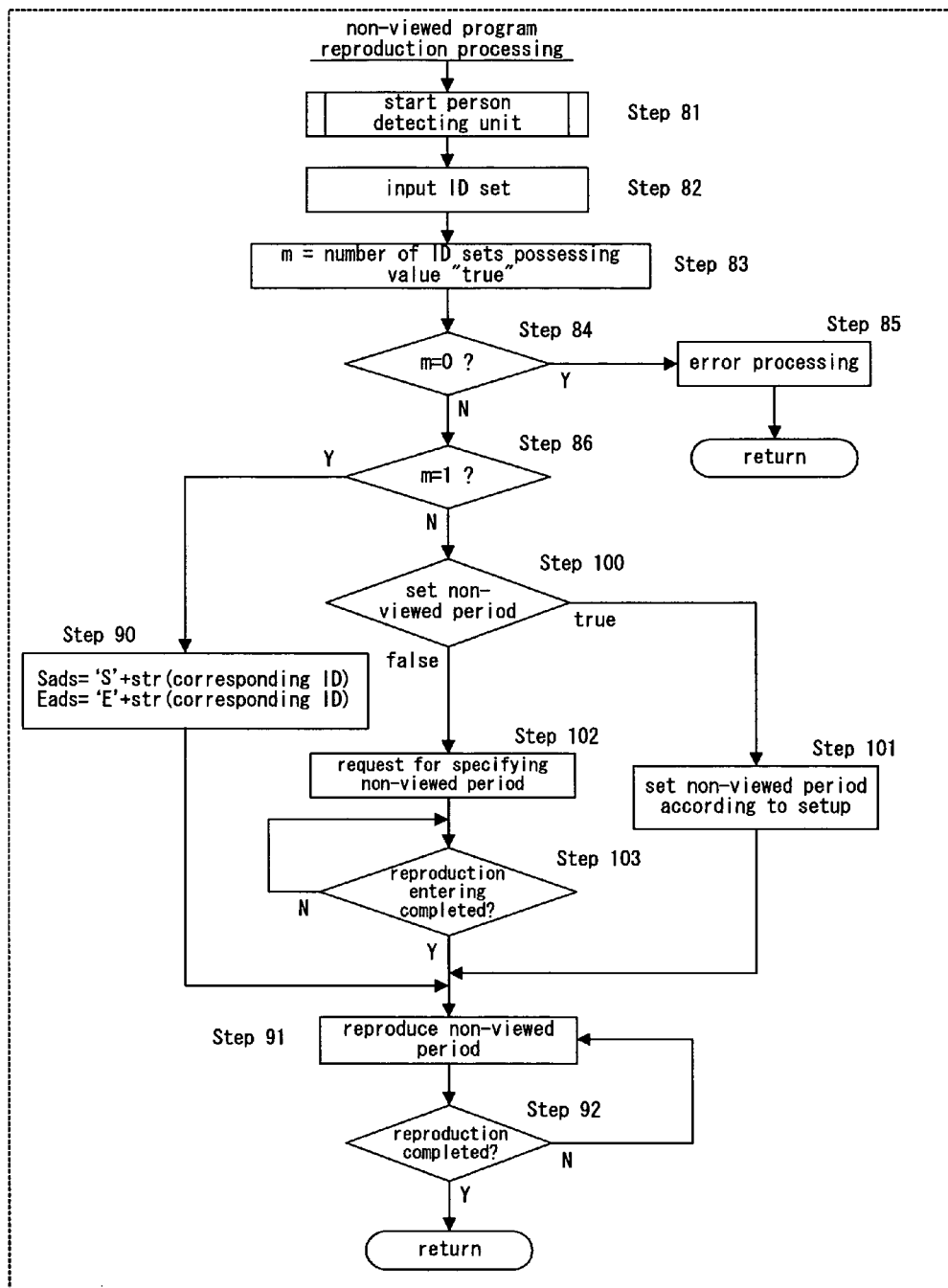
FIG. 16 is the flow chart of the reproduction control unit in the modification of the present invention.

The processing from Step 86 to Step 91 in FIG. 8 may be changed as shown in FIG. 16. Namely, when the number m is "1", in a similar way as in FIG. 8, the tag character strings Sads and Eads are immediately defined, and the processing moves to Step 91.

When the number m is equal to or greater than "2," the non-viewed period is determined at Step 100 to Step 103, and the processing moves to Step 91. At Step 100, the reproduction control unit 6 checks whether there is any setup of the non-viewed period.

The "setup" defines a determination procedure of the period that should be reproduced when a plurality of viewers exist, and it is performed by such as a logical sum (when at least one viewer was not viewing, it is considered as a non-viewed period) and a logical product (when none of the viewers were viewing, it is considered as a non-viewed period) of the non-viewed periods for these viewers. Of course, the logical sum and the logical product may be combined. It is also possible to give a privilege to a specified viewer who has higher priority than others.

If there is a setup of the non-viewed period, the reproduction control unit 6 determines the non-viewed period according to the setup (Step 101).

If there is no setup of the non-viewed period, the reproduction control unit 6 orders the monitor 2 to display the necessary information, and requests the viewer to input the necessary information from the operation entering unit 4 (Steps 102 and 103).

Figure 18A:
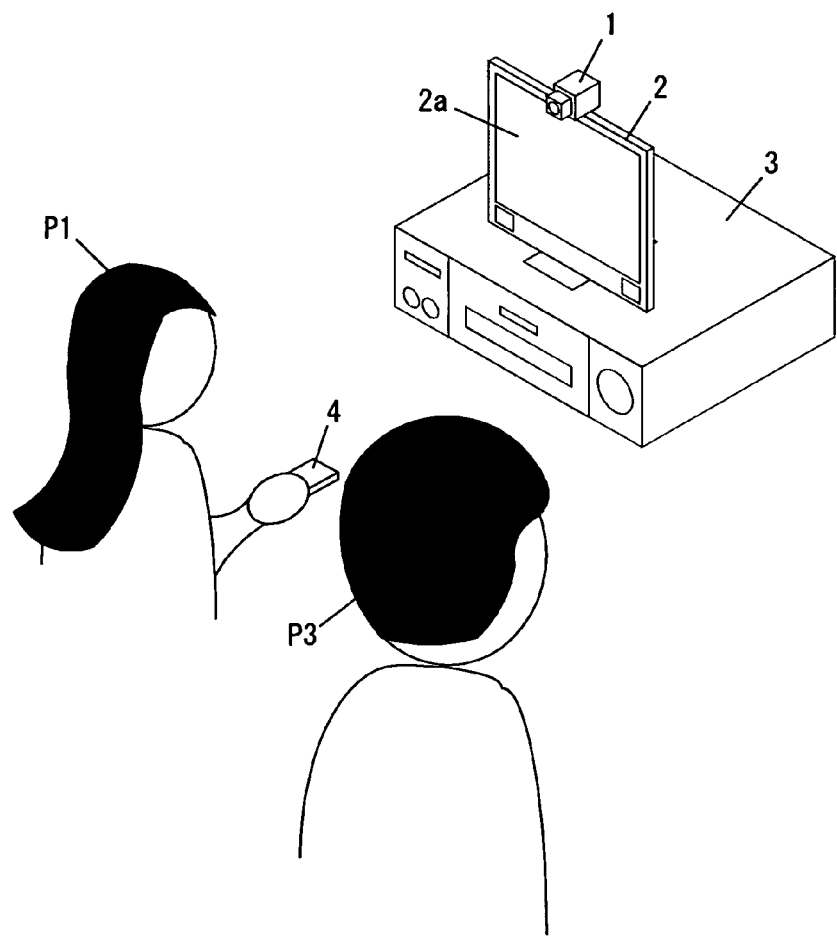
FIG. 18(a) and FIG. 18(b) are exemplification diagrams of the viewing state in the modification of the present invention.
Figure 18B:
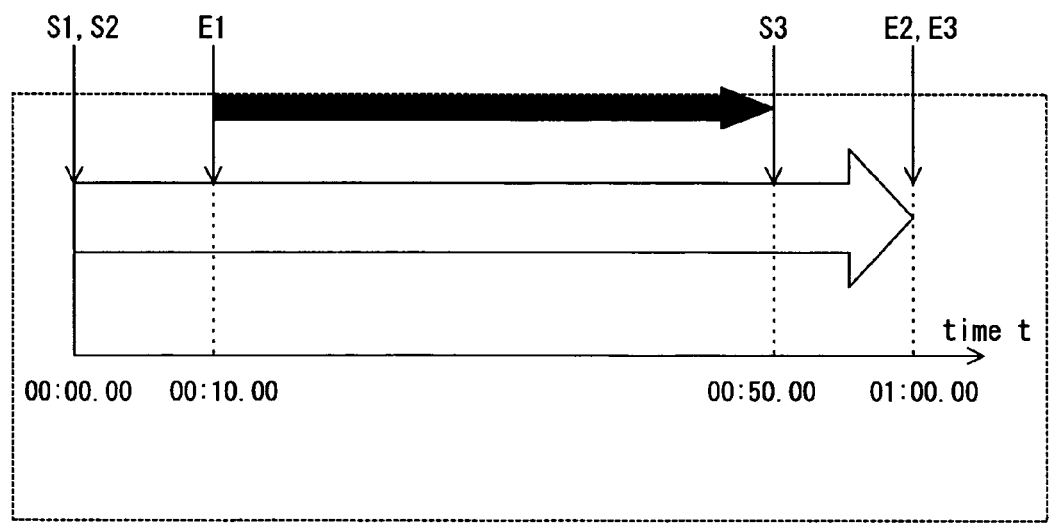

For example, at Step 100, in a case where the logical product of the non-viewed period is set up, as shown in FIG. 18(a), when the mother P1 and the father P3 come back in front of the stream reproducing device 3, and direct the reproduction of the non-viewed period using the operation entering unit 4, the stream for the non-viewed period (from a tag 'E1' to a tag 'S3') is reproduced, as shown by the black arrow in FIG. 18(b). In this case, the stream after the tag 'S3' is not reproduced, since it is not the non-viewed period of the father P3. If the logical sum of the non-viewed period is set up, the stream for the non-viewed period (from a tag 'S1' to a tag 'E3') is reproduced.

Figure 17:
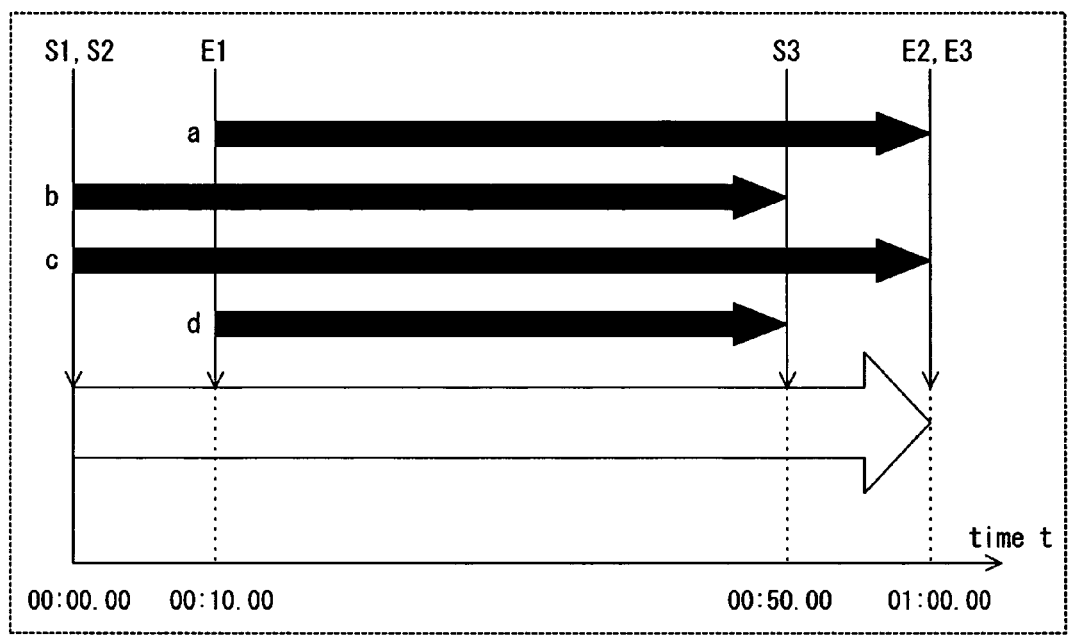
FIG. 17 is an exemplification diagram of the viewing state in the modification of the present invention.

On the other hand, at Step 100, when there is no setup of the non-viewed period, the non-viewed period a of the mother P1 and the non-viewed period b of the father P3 are displayed (Step 102), as shown in FIG. 17. The non-viewed period c is the logical sum of the non-viewed periods a and b. The non-viewed period d is the logical product of non-viewed periods a and b. The viewer (either the mother P1 or the father P3) chooses either the non-viewed period c or the non-viewed period d by looking at the display.

Even in either case, it is sufficient that the mother P1 and the father P3 only direct the reproduction of the non-viewed period, or simply choose the non-viewed period at most. Thus, troublesome operation such as rewinding and fast-forwarding is not necessary.

The value of FIG. 2(b) is not limited to only "true" or "false", but also can be extended as follows. For example, it is also preferable to classify the value "false" in more detail as the value of FIG. 2(b), by setting the values of "break" (the viewer has viewed at least a part of the current stream, but is not viewing the current stream right now) and "non-viewed" (the viewer has not viewed the current stream at all). It is also preferable that the value of FIG. 2(b) can express the total number of the non-viewed period.

Figures 19, 20:
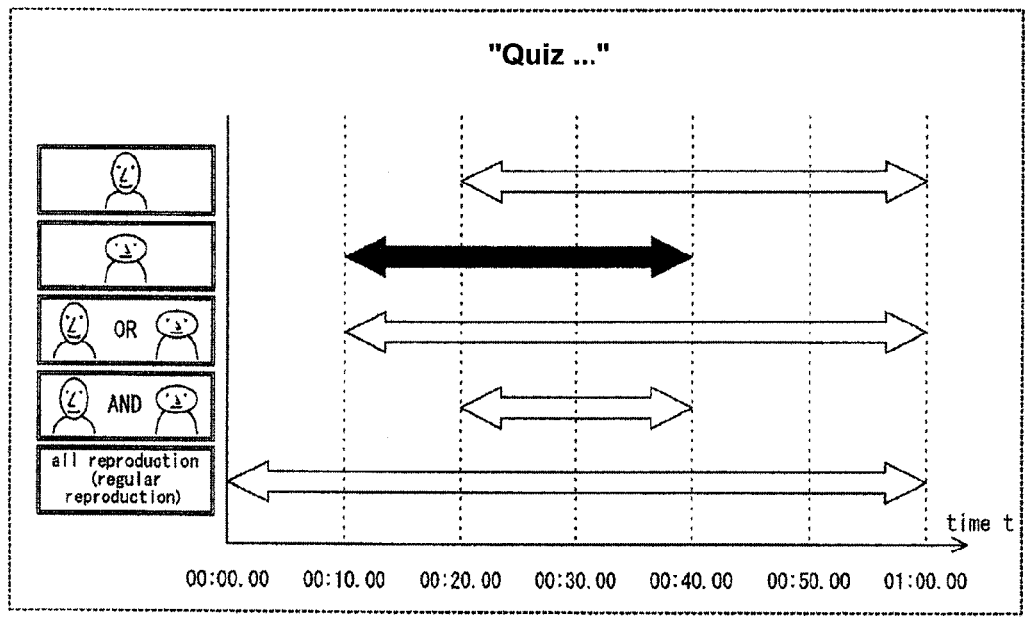
FIG. 19 is an exemplification diagram of a display in the modification of the present invention.
FIG. 20 is an exemplification diagram of a display in the modification of the present invention.
Figure 21:
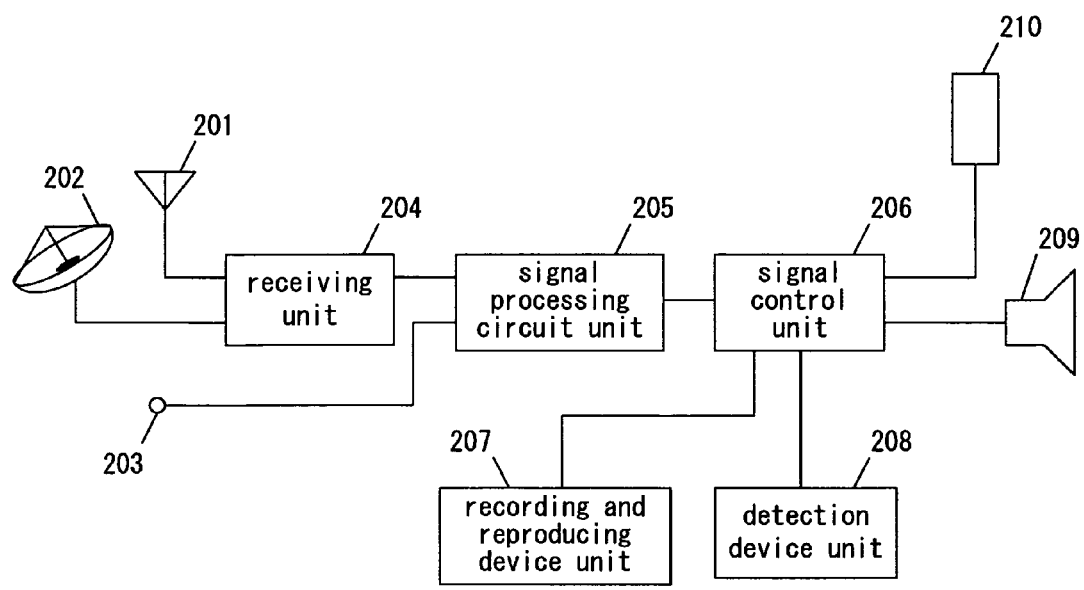
FIG. 21 is a block diagram illustrating the conventional television receiver.

Furthermore, as shown in FIG. 19, for example, when the portrait images of three viewers are registered in the person database 7, and when the two viewers shown in the second line are present in front of the stream reproducing device 3, it is easily understandable and preferable that the title (for example, a program name) of the stream and the corresponding portrait image of the person having the non-viewed period are displayed side by side.

When there is no setup of the non-viewed period, as shown in FIG. 20, it is easily understandable and preferable that the candidates of the non-viewed period are displayed in liaison with the portrait images for the two viewers present in front of the stream reproducing device 3.

According to the present invention, automatic recording of the audio and video signal itself for the non-viewed period is not necessary; therefore, the viewer can view the stream for the non-viewed period later, without heavily using the storage capacity.

Furthermore, the present invention can handle a case where unspecified viewers come and go one after the other and possess their own non-viewed periods. Even in the case, each of the viewers can enjoy the respective automatic viewing of his/her own non-viewed period later on, without performing troublesome operation such as rewinding and fast-forwarding.

INDUSTRIAL APPLICABILITY

The stream reproducing device related to the present invention can be suitably used in a field such as a DVD player, a DVD recorder, an HD recorder, and a stream distributing device or receiving device via a network.

The invention claimed is:

1. A stream reproducing device comprising:
    a detection unit that is arranged towards a plurality of viewers and that is operable to detect a presence of any of the plurality of viewers and operable to output a result of the detection;
    a person detecting unit operable to detect and distinguish each individual viewer of the plurality of viewers from any other viewer of the plurality of viewers based on the output of said detection unit;
    a viewing information generating unit operable to generate viewing information with respect to each individual viewer of the plurality of viewers based on a result of the detecting and distinguishing of said person detecting unit; and
    a reproduction control unit operable to be supplied with a stream and operable to control a reproduction of the stream in order to output the reproduction of the stream,
    wherein the generated viewing information, with respect to each individual viewer of the plurality of viewers, is related to a time stamp of the stream, such that the generated viewing information, with respect to each respective individual viewer of the plurality of viewers, indicates a non-viewed period during which each respective individual viewer of the plurality of viewers has not viewed the reproduction of the stream, and
    wherein, when viewers are detected to be present in front of the stream reproducing device, the non-viewed period is determined, collectively for the viewers detected to be present, according to a logical product and/or a logical sum of each non-viewed period of the viewers detected to be present.

2. The stream reproducing device as defined in claim 1, further comprising an operation entering unit operable to accept an input from a viewer of the plurality of viewers,
    wherein, when the input accepted by said operation entering unit is a direction to reproduce the non-viewed period of the stream indicated by the generated viewing information related to the viewer from which the input has been accepted, said reproduction control unit identifies the non-viewed period of the stream based on the generated viewing information related to the viewer from which the input has been accepted and reproduces the non-viewed period of the stream.

3. The stream reproducing device as defined in claim 1, further comprising an operation entering unit operable to accept an input from a viewer of the plurality of viewers,
    wherein, when the input accepted by said operation entering unit is a direction to reproduce the non-viewed period of the stream indicated by the generated viewing information related to the viewer from which the input has been accepted, said reproduction control unit requires said person detecting unit to identify the viewer from which the input has been accepted, and
    wherein said reproduction control unit identifies the non-viewed period of the stream based on the generated viewing information related to the viewer identified by said person detecting unit and reproduces the non-viewed period of the stream.

4. The stream reproducing device as defined in claim 1, wherein the generated viewing information, with respect to each individual viewer of the plurality of viewers, includes information related to (i) a time stamp marked when each respective individual viewer of the plurality of viewers starts viewing the reproduction of the stream and (ii) a time stamp marked when each respective individual viewer of the plurality of viewers ends viewing the reproduction of the stream.

5. The stream reproducing device as defined in claim 1, wherein the generated viewing information is stored inside the stream.

6. The stream reproducing device as defined in claim 1, wherein the generated viewing information is stored outside the stream.

7. The stream reproducing device as defined in claim 1, wherein said detection unit includes one of a camera and a sensor.

8. The stream reproducing device as defined in claim 1,
wherein said detection unit comprises a camera operable to obtain a portrait image,
wherein said stream reproducing device further comprises:
a person template;
a person database operable to store, in a corresponding manner, identification information of each respective viewer of the plurality of viewers and a portrait image of each respective viewer of the plurality of viewers obtained by said camera, and
a correlation calculating unit operable to perform a correlation calculation between a portrait image obtained by said camera and the person template, and operable to perform a correlation calculation between a portrait image obtained by said camera and the portrait image stored in said person database,
each respective viewer of the plurality of viewers is viewing the reproduction of the stream, based on the result of the correlation calculation between each portrait image obtained by said camera and the person template, and
wherein when said person detecting unit judges that a viewer of the plurality of viewers is viewing the reproduction of the stream, said person detecting unit identifies the viewer that is viewing the reproduction of the current steam, based on the result of the correlation calculation between the portrait image obtained by said camera and each portrait image stored in said person database.

9. The stream reproducing device as defined in claim 8, wherein when said person detecting unit judges that the viewer is viewing the reproduction of the stream, and when it is determined the portrait image of the viewer obtained by said camera does not match any one of stored portrait images, based on the result of the correlation calculation between the portrait image of the viewer obtained by said camera and each of the stored portrait images, said person detecting unit adds to the person database, in a corresponding manner, new identification information of the viewer and the portrait image of the viewer obtained by said camera.

10. The stream reproducing device as defined in claim 1, further comprising a stream feed unit including recording media operable to record the stream and operable to supply said reproduction control unit with the stream.

11. The stream reproducing device as defined in claim 1, further comprising a monitor operable to reproduce content of the stream based on the reproduced stream outputted by said reproduction control unit.

* * * * *

UNITED STATES PATENT AND TRADEMARK OFFICE
CERTIFICATE OF CORRECTION

PATENT NO. : 7,730,505 B2 Page 1 of 1
APPLICATION NO. : 11/597288
DATED : June 1, 2010
INVENTOR(S) : Eiji Fukumiya et al.

It is certified that error appears in the above-identified patent and that said Letters Patent is hereby corrected as shown below:

On the Title Page

In Section (30) Foreign Application Priority Data, please insert the following:

-- Sep. 2, 2004   (JP)...................... 2004-255291 --

Signed and Sealed this

Twenty-fourth Day of August, 2010

David J. Kappos
*Director of the United States Patent and Trademark Office*